(12) United States Patent
Onishi

(10) Patent No.: US 7,924,470 B2
(45) Date of Patent: Apr. 12, 2011

(54) DOCUMENT PROCESSING METHOD, DOCUMENT PROCESSING APPARATUS AND PROGRAM

(75) Inventor: Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1239 days.

(21) Appl. No.: 11/406,270

(22) Filed: Apr. 19, 2006

(65) Prior Publication Data

US 2007/0031046 A1 Feb. 8, 2007

(30) Foreign Application Priority Data

Jun. 28, 2005 (JP) ................................ 2005-187586

(51) Int. Cl.
*H04N 1/40* (2006.01)
*G06K 15/00* (2006.01)
*H04L 9/32* (2006.01)

(52) U.S. Cl. ........................ 358/3.28; 358/1.14; 713/168

(58) Field of Classification Search .................. 358/1.9, 358/3.26, 3.28, 1.14; 382/100, 167; 713/168, 713/176

See application file for complete search history.

(56) References Cited

U.S. PATENT DOCUMENTS

| 2001/0044899 | A1* | 11/2001 | Levy ............................. 713/176 |
| 2002/0006212 | A1* | 1/2002 | Rhoads et al. ................. 382/100 |
| 2002/0054778 | A1* | 5/2002 | Ericson et al. .................. 400/76 |
| 2002/0065853 | A1* | 5/2002 | Takahashi et al. ............. 707/527 |
| 2002/0083324 | A1* | 6/2002 | Hirai ............................. 713/176 |
| 2003/0115470 | A1 | 6/2003 | Cousins et al. |
| 2003/0149879 | A1* | 8/2003 | Tian et al. ..................... 713/176 |

FOREIGN PATENT DOCUMENTS

| JP | A 06-214862 | 8/1994 |
| JP | A 2002-279289 | 9/2002 |
| JP | A 2003-044257 | 2/2003 |
| JP | A-2003-242347 | 8/2003 |
| JP | A 2003-256762 | 9/2003 |
| JP | A-2005-135211 | 5/2005 |

OTHER PUBLICATIONS

Oct. 12, 2010 Office Action issued in Japanese Patent Application No. 2005-187586 (with translation).

* cited by examiner

*Primary Examiner* — James A Thompson

(74) *Attorney, Agent, or Firm* — Oliff & Berridge, PLC

(57) ABSTRACT

A document processing apparatus processes an encoded document, which is a medium on which a machine readable code comprising a code of an encoded electronic document is formed. The document processing apparatus includes an acquiring unit, an editing-information managing unit and a decoding process unit. The acquiring unit acquires the machine readable code read from the encoded document. The editing-information managing unit manages editing information of the electronic document, which is an original document of the encoded document. The decoding process unit decodes the acquired machine readable code on a basis of the editing information.

14 Claims, 9 Drawing Sheets

FIG. 3
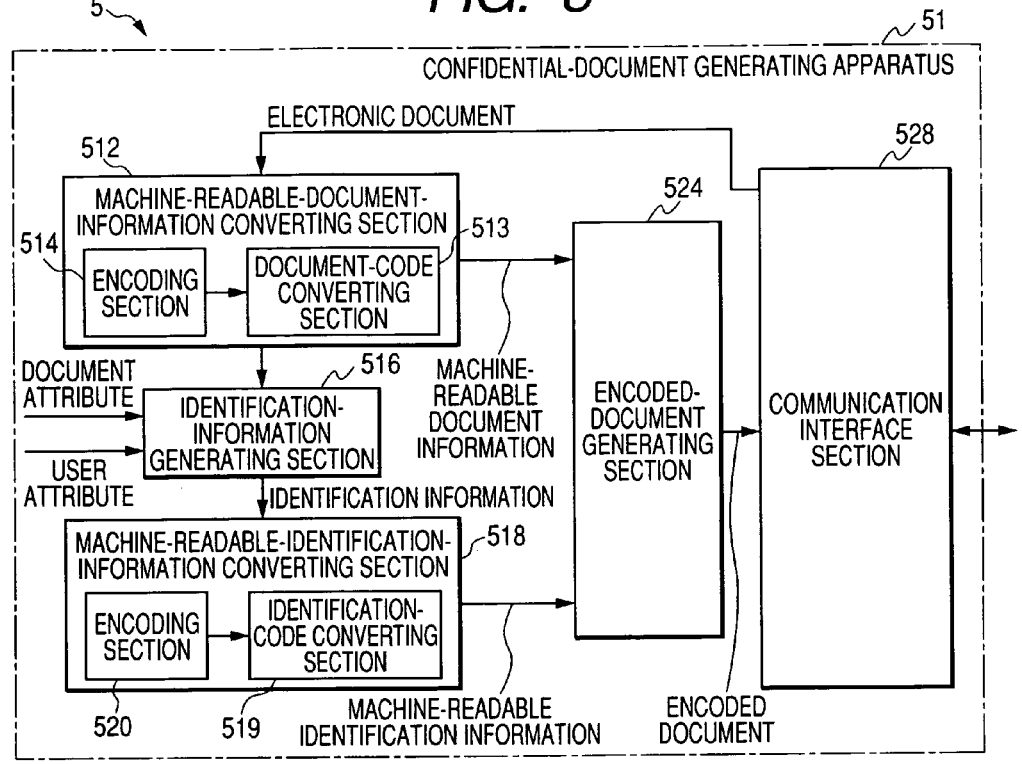
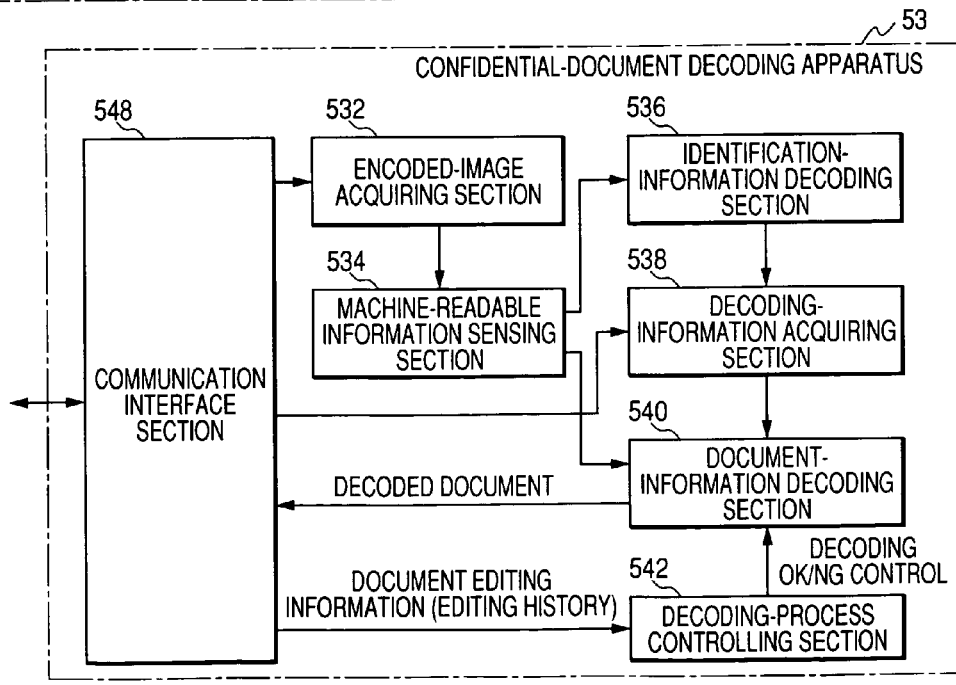

ENCODED APPLICATION FORM

ENTERED APPLICATION FORM

ORIGINAL APPLICATION FORM

DOCUMENT PROCESSING METHOD, DOCUMENT PROCESSING APPARATUS AND PROGRAM

CROSS-REFERENCE TO RELATED APPLICATION

The entire disclosure of Japanese Patent Application No. 2005-187586 filed on Jun. 28, 2005, including the specification, claims, drawings and abstract is incorporated herein by reference in its entirety.

BACKGROUND

1. Technical Field

The invention relates to a document processing method and a document processing apparatus, and a program. For example, the invention relates to a system capable of dealing with an encoded document.

2. Related Art

In the field where a document exchange—such as submission of various applications to various public institutions typified by a government office, an ordinary company, and the like—is carried out, the trend toward so-called paperless becomes quite common. For this reason, the movement to replace an information transfer using the conventional paper medium with the approach using the electronic information is advancing everywhere.

Meanwhile, in contrast to such movement, application and a document transfer using a paper as a medium in the prior art are still carried out widely. However, when the paper is used as the information transmission medium, in many cases the manual medium transportation such as mail service, delivery by hand, or the like is employed until such paper medium is sent to the final destination (submission address) of the paper information. In the course of this medium transportation, other people's eye falls on the information printed or handwritten on the paper medium except a sealed document. Therefore, there is such a problem that the information that the private person wishes other people except the submission address not to know are known to other people. As a consequence, various systems for solving the problem of such information leakage have been proposed.

SUMMARY

According to an aspect of the invention, a document processing apparatus processes an encoded document, which is a medium on which a machine readable code including a code of an encoded electronic document is formed. The document processing apparatus includes an acquiring unit, an editing-information managing unit and a decoding process unit. The acquiring unit acquires the machine readable code read from the encoded document. The editing-information managing unit manages editing information of the electronic document, which is an original document of the encoded document. The decoding process unit decodes the acquired machine readable code on a basis of the editing information.

BRIEF DESCRIPTION OF THE DRAWINGS

FIG. 3 is a functional block diagram showing a configurative example of a confidential-document processing server.

DETAILED DESCRIPTION

Embodiments of the invention will be explained in detail with reference to the drawings hereinafter.

Figure 1:
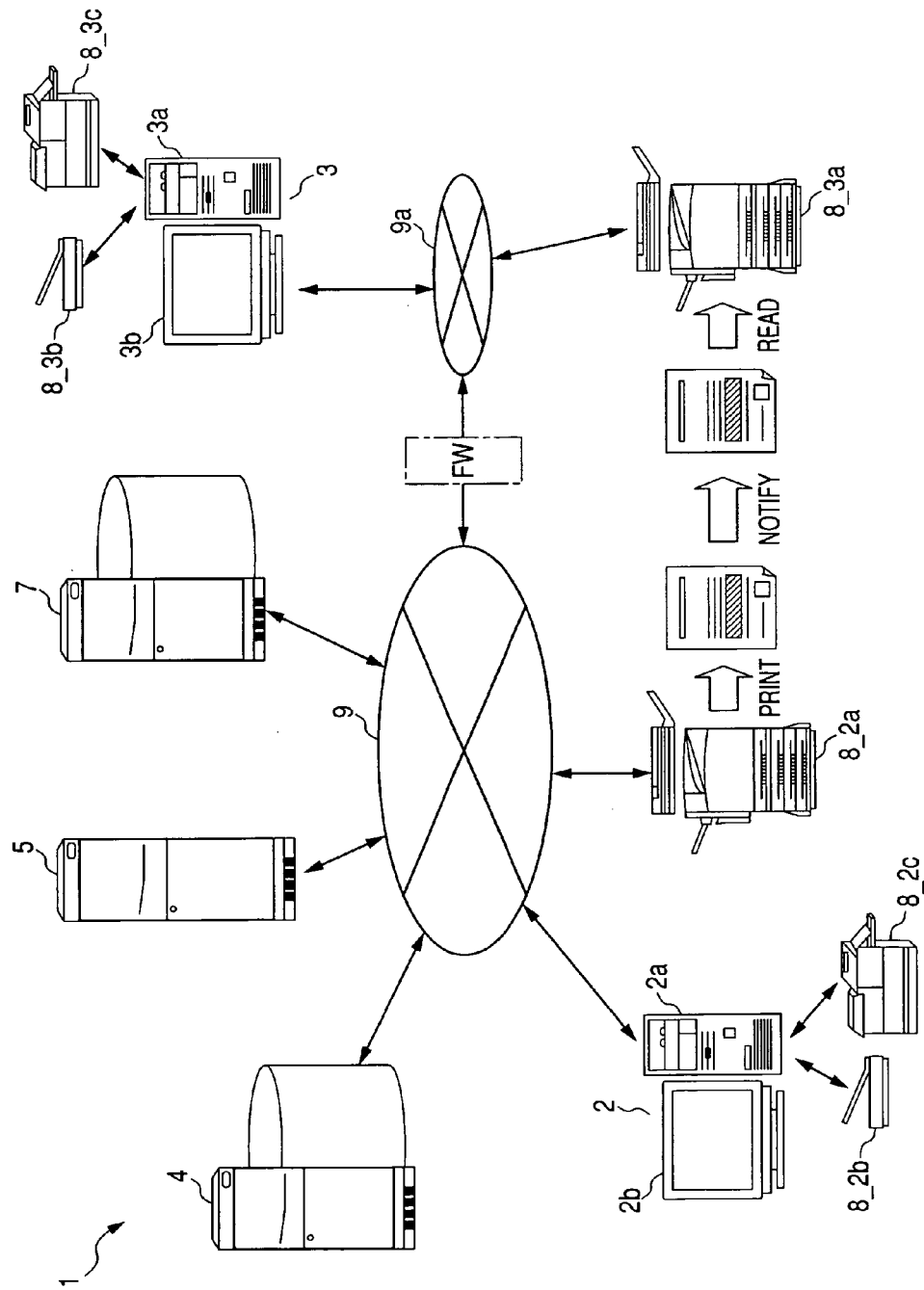
FIG. 1 is a view showing an overall outline of a document processing system, which executes a document processing method according to an embodiment of the invention.

FIG. 1 is a view showing an overall outline of a document processing system that implements a document processing method according to an embodiment of the invention. Here, in this embodiment, it is assumed that when an applicant who is a private person performs predetermined application procedures for a destination agent, which may be a public institution such as a government office or a private institution such as a bank and a stock company, the applicant uses a confidential document.

As shown in FIG. 1, a document processing system 1 of this embodiment includes an applicant terminal 2, a destination terminal 3, a document repository server 4, a confidential-document processing server 5, a decoding information managing server 7 and an image forming apparatus 8. The applicant terminal 2 may be a personal computer, which issues a print output instruction of the confidential document and a decoding instruction of the confidential document. The applicant terminal 2 functions as a user terminal on the applicant side. The destination terminal 3 serves as a user terminal on the destination agent side. The document repository server 4 manages the confidential document as an electronic document. The confidential-document processing server 5 executes various processes regarding the confidential document such as a print outputting process of the confidential document and a decoding process of the confidential document, which are instructed by the user. The decoding-information managing server 7 executes processes regarding a key, which is used in an encoding process of a confidential portion of the document. The image forming apparatus 8 has multi functions such as outputting the confidential document onto a paper sheet and reading a confidential document image output onto the paper sheet.

The document repository server 4, the confidential-document processing server 5 and the decoding-information managing server 7 are examples of the document processing apparatus. These apparatuses are brought to be accessible to each other via a predetermined network (e.g., the Internet) 9.

As the image forming apparatus 8, a multi function device having an image reading function (image inputting unit) and an image outputting function (image outputting unit) is used. Also, as the image forming apparatus 8, an image forming apparatus 8_2a used by the applicant and an image forming apparatus 8_3a used by the destination agent are provided. The apparatus provided in a regional office such as a convenience store, for example, is assumed as the image forming apparatus 8_2a. Also, the apparatus connected to a private LAN (Local Area Network) 9a, which is a network on the destination agent side, is assumed as the image forming apparatus 8_3a.

The applicant terminal 2 used by the applicant includes a terminal main body 2a and a display section 2b constructed by a CRT or a liquid crystal to display an operation screen. A scanner 8_2b functioning as an image reading apparatus and a printer 8_2c functioning as an image outputting apparatus can be connected to the applicant terminal 2. The applicant sends for an electronic document of a blank application from the document repository server 4 by using the applicant terminal 2 to print/output it by the printer 8_2c (or the image forming apparatus 8_2a), then enters necessary items into this printed out blank application by handwriting, then causes the scanner 8_2b (or the image forming apparatus 8_2a) to read the entered application form whose entering is completed, and then saves this entered application once in the document repository server 4. Alternatively, the applicant may access the document repository server 4 to enter the necessary items on a display screen of the applicant terminal 2, and save them in the document repository server 4 as they are.

When the applicant wishes to print/output this entered application later, such applicant accesses the confidential-document processing server 5 from the applicant terminal 2 or the image forming apparatus 8_2a to instruct the server 5 to print/output, to thereby form an encoded application, which is to be submitted to the destination agent and whose confidential portion is concealed.

The destination terminal 3 provided in the destination agent has a terminal main body 3a and a display portion 3b constructed by a CRT, a liquid crystal, or the like to display an operation screen. A scanner 8_3b functioning as an image reading apparatus and a printer 8_3c functioning as an image outputting apparatus can be connected to the destination terminal 3. A document utilizing program used to decode the encoded application form sent from the applicant is provided for the destination terminal 3 from a predetermined program providing agent, and installed therein. Also, the destination terminal 3 is connected to the network 9 via the private LAN 9a and a firewall FW.

When the encoded application form sent from the applicant is decoded as a visible application form (entered application form) at the destination agent so that such a visible application form is available in the office works such as registration, firstly the encoded application form is read by the image forming apparatus 8_3a connected via the private LAN 9a or the scanner 8_3b connected to the destination terminal 3. Then, read image data are sent to the confidential-document processing server 5.

The document repository server 4 manages documents, which are originals of application documents (so-called application form). For example, the document repository server 4 has a document management table used to manage a plurality of documents. Also, the document repository server 4 saves electronic documents of the encoded application forms, which the applicant requires to store temporarily.

Also, the document repository server 4 stores attribute information (referred to as "document editing information" hereinafter) relating to an editing process of the entered electronic document (in this example, the entered application form) and identification information (e.g., document ID) with those information associated with each other. Here, the document editing information are used to manage that an attribute change such as reediting, modification, deletion, or invalidation is applied to the entered electronic document, i.e., an editing history regarding the document. In this embodiment, the document editing information is referred to in a decoding process of an encoded document a part (typically, a confidential portion) of which is in an unreadable state, to control whether or not the decoding process can be executed (details will be described later).

Any information may be used as the identification information so long as such information can be used to acquire directly or indirectly the original document (in this example, the original of the application form or the entered application form). The original document itself corresponds to the electronic document itself consisting of binary data and, for example, corresponds to a word processor document itself when the document is prepared by a word processor. For example, when the original document is directly picked up, a file name specifying the original document itself, which is the binary data, can be utilized as the identification information. Alternately, for example, when the original document is indirectly acquired, various original document data are managed in a database such as an SQL server in a table form and then an identification code indicating a correlation between them can be used as the identification information.

Also, if the identification information is generated based on the document editing information, actually if only the editing history of the attribute concerning the identification information is managed, the editing history regarding the document can be managed. Also, if the identification information is generated based on attribute information regarding a user (also referred to as a "user attribute" hereinafter) such as a name or age of the user, a department or an access right, it can be controlled in units of the user whether or not the decoding process of the document can be executed. For example, the decoding process is prohibited, when the department or the access right is changed to what has no permission of the decoding process. Of course, if the identification information is generated based on both the document editing information and the user attribute, it can be controlled whether or not the decoding process of the document can be executed, from both points of view of the editing history and the user attribute.

The confidential-document processing server 5 is provided for the agent (also referred to as an "encoding processing agent" hereinafter), which forms an encoded application form that is unreadable by encoding a portion—whose security must be ensured (confidential portion)—of the user's entered portions in a predetermined formatted application document or using a coded image (e.g., a barcode). A printing program used to form the encoded application form from the application documents on which the applicant handwrites is provided to the confidential-document processing server 5 from a predetermined program providing agent, and installed therein. The confidential-document processing server 5 sends the electronic document of the generated encoded application form to the image forming apparatus 8_2a, which is designated by the user to output (or the applicant terminal 2), via the network 9 so that the encoded application form can be output from the image forming apparatus 8_2a (or the printer 8_2c connected to the applicant terminal 2).

Also, when the decoding process is demanded from the destination terminal 3, the confidential-document processing server 5 executes the decoding process of the encoded portion in accordance with predetermined procedures (details will be described later) to acquire original information (i.e., information entered by the applicant) of the encoded portion, then synthesizes the decoded entered information and the substantial information of the original of the application form to decode substantial information of the entered application documents, and then provides the decoded result to the destination terminal 3 as the electronic document.

The decoding-information managing server 7 saves control information (decoding control information) used to decode the encoded portion of the encoded application form with the control information associated with identification information, which uniquely specifies information of the encoded portion.

Also, the decoding-information managing server 7 has a key providing server function capable of providing a decoding key, which is necessary for the decoding process executed in the confidential-document processing server 5. For example, when the public key cryptosystem is employed, this decoding-information managing server 7 has a public key server function capable of providing a public key, which the destination agent possesses, on-line and manages a key management table.

In the document processing system 1 having such configuration, as briefly described above, when the decoding process for the encoded application form is required, it is controlled whether or no the decoding process can be executed, by referring to the document editing information (details will be described later).

According to this configuration, if the decoding process is permitted after the attribute change such as reediting, modification, deletion or invalidation is applied, a user having a valid access right (in this example, a person of the destination agent in charge) can check contents of a confidential portion in an encoded application form, which is submitted from an applicant as a printed matter and the confidential portion of which is concealed, on the destination terminal 3. In contrast, if the decoding process is prohibited after the attribute change such as reediting, modification, deletion or invalidation is applied, even the user having the valid access right (in this example, the person of the destination agent in charge) cannot check the contents of the confidential portion in the encoded application form on the destination terminal 3.

In other words, it can be controlled whether or not decoding of a machine readable code printed on a paper sheet can be executed, by controlling whether or not the decoding process can be executed, based on the attribute change applied to the document. Thus, the view of the designated portion on the paper sheet can be controlled jointly with the attribute of the electronic document. Therefore, a security function of the portion—a security of which must be ensured—of the printed document can be sufficiently guaranteed and also a matching between the editing applied to the original electronic document and a decision as to whether or not the decoding process can be executed can be achieved.

Next, a specific configurative example of respective apparatuses (containing the servers) constituting the document processing system 1 shown in FIG. 1 will be described.

<Configurative Example of Document Repository Server>

Figure 2:
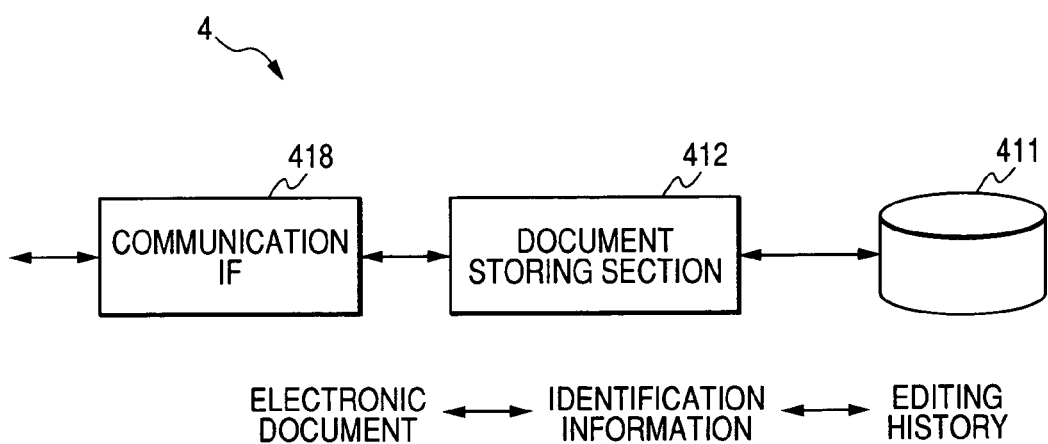
FIG. 2 is a functional block diagram showing a configurative example of a document repository server.

FIG. 2 is a functional block diagram showing a configurative example of the document repository server 4. The document repository server 4 includes a document storing section 412 and a communication IF (interface) 418. The document storing section 412 stores the electronic document of the original of the entering document and the electronic document of the entered document in a memory medium 411 such as a hard disk drive or an optical disk drive, with those documents associated with the identification information, which can uniquely specify those documents. Anything such as document file name or document ID can be used as the identification information so long as it can specify a document. At this time, it should also be managed whether or not the attribute change of the electronic document such as reediting, modification, deletion, invalidation, or the like has been applied (so-called editing history).

<Configurative Example of Confidential-Document Processing Server>

FIG. 3 is a functional block diagram showing a configurative example of the confidential-document processing server 5. The confidential-document processing server 5 includes respective functional sections of a confidential-document generating apparatus 51 for generating the confidential document having the coded image, and respective functional sections of a confidential-document decoding apparatus 53 for decoding the confidential document having the coded image. Both the confidential-document generating apparatus 51 and the confidential-document decoding apparatus 53 are examples of the document processing apparatus.

<Confidential-Document Generating Apparatus>

The confidential-document generating apparatus 51 includes a machine-readable-document-information converting section 512, an identification-information generating section 516 and a machine-readable-identification-information converting section 518. The machine-readable-document-information converting section 512 converts the designated portion (in this example, the portion whose security must be ensured) of the electronic document into information, which is unreadable and machine readable (also referred to as "machine-readable document information" hereinafter). The identification-information generating section 516 generates the identification information, which can uniquely specify the machine-readable document information generated by the machine-readable-document-information converting section 512 using the attribute information of the electronic document or the user attribute information. The machine-readable-identification-information converting section 518 converts the identification information generated by the identification-information generating section 516 into information, which is unreadable and machine readable (also referred to as "machine-readable identification information" hereinafter).

Also, the confidential-document generating apparatus 51 includes an encoded-document generating section 524 and a communication IF (interface) section 528. The encoded-document generating section 524 synthesizes the machine-readable document information generated by the machine-readable-document-information converting section 512, the machine-readable identification information generated by the machine-readable-identification-information converting section 518 and the electronic document acquired from the document repository server 4 (in this example, the entered application form) to generate the encoded document. The electronic document is received and transmitted via the communication IF section 528.

The machine-readable-document-information converting section 512 includes at least one of a document-code converting section 513 and an encoding section 514. The document-code converting section 513 converts information of the portion, whose security must be ensured, of the electronic document into a one-dimensional or two-dimensional barcode or a digital watermark (also referred to as a "machine-readable document code" hereinafter). The encoding section 514 encodes the information of the portion, whose security must be ensured, of the electronic document using a predetermined encoding key. The one-dimensional barcode, the two-dimensional barcode and the digital watermark are examples of the machine-readable document information. These sections relate to a security function regarding the document.

When both the document-code converting section 513 and the encoding section 514 are provided, firstly the encoding section 514 executes the encoding, and then the document-code converting section 513 converts the entered information, which has been encoded (encoded entered information), into the machine-readable document code. Then, the encoded-document generating section 524 generates the encoded document using the encoded machine-readable document code generated by the document-code converting section 513.

Meanwhile, it is not essential that the encoding section 514 is provided. In this case, the document-code converting section 513 converts directly the information of the portion whose security must be ensured into the machine-readable document code, and the encoded-document generating section 524 generates the encoded document using the unencoded machine-readable document code generated by the document-code converting section 513. Also, it is not essential that the document-code converting section 513 is provided. In this case, the encoding section 514 encodes the information of the portion whose security must be ensured, and the encoded-document generating section 524 generates the encoded document using the information encoded by the encoding section 514.

Also, like the machine-readable-document-information converting section 512, the machine-readable-identification-information converting section 518 has at least one of an identification-code converting section 519 and an encoding section 520. The identification-code converting section 519 converts the identification information into a one-dimensional barcode, two-dimensional barcode or a digital watermark (also referred to as a "machine-readable identification code" hereinafter). The encoding section 520 encodes the identification information using a predetermined encoding key. The one-dimensional barcode, the two-dimensional barcode and the digital watermark are examples of the machine-readable document information. These sections relate to a security function regarding the identification information. It is noted that such a configuration may be employed that both the identification-code converting section 519 and the encoding section 520 are not provided.

When both the identification-code converting section 519 and the encoding section 520 are provided, firstly the encoding section 520 executes the encoding, and then the identification-code converting section 519 converts the encoded identification information into the machine-readable identification code. Then, the encoded-document generating section 524 generates the encoded document using the encoded machine-readable identification code generated by the identification-code converting section 519.

By the way, it is not essential that the encoding section 520 is provided. In this case, the identification-code converting section 519 converts directly the identification information generated by the identification-information generating section 516 into the machine-readable identification code, and the encoded-document generating section 524 generates the encoded document using the unencoded machine-readable identification code generated by the identification-code converting section 519. Also, it is not essential that the identification-code converting section 519 is provided. In this case, the encoding section 520 encodes the identification information generated by the identification-information generating section 516, and the encoded-document generating section 524 generates the encoded document using the identification information encoded by the encoding section 520.

When the identification-code converting section 519 is not provided, the encoded information (containing the identification information encoded by the encoding section 520) is printed as it is, and then read and recognized. Therefore, a reproducing accuracy of the identification information depends on a character recognizing performance. In contrast, when the identification-code converting section 519 is provided, the coded identification information is printed, and then read and recognized. Therefore, such an advantage can be achieved as an ordinary effect of the coding that a reproducing accuracy can be improved. This is because normally the coding process contains countermeasure against data errors such as parity.

Also, when such a configuration is employed that both the document-code converting section 513 and the encoding section 514 are not provided, the machine-readable-identification-information converting section 518 transfers the identification information generated by the identification-information generating section 516 as it is to the encoded-document generating section 524 as the machine-readable identification information. The identification information is utilized to ensure a correlation among the document data (electronic document), the decoding information, and the attribute information (document editing information) relating to the editing process of the encoded application form. In comparison with the confidential portion, there is no great necessity to conceal the identification information. Therefore, even when the identification information generated by the identification-information generating section 516 is printed on the encoded application as it is, no great problem would arise.

The communication IF portion 528 receives an output instruction from the applicant terminal 2, receives the electronic document from the document repository server 4, and sends out the encoded document generated by the encoded-document generating section 524 to the applicant terminal 2 or the image forming apparatus 8_2a. Upon receiving the encoded document, the applicant terminal 2 or the image forming apparatus 8_2a prints/outputs the encoded document.

<Details of Processes in Document Code Generating Section>

In converting the information of the portion whose security (concealability) must be ensured in the electronic document (containing the information encoded by the encoding section 514) or the identification information into the machine readable code image, the document-code converting section 513 of the machine-readable-document-information converting section 512 and the identification-code converting section 519 of the machine-readable-identification-information converting section 518 may utilize the two-dimensional barcode and also may utilize the one-dimensional barcode.

When the two-dimensional barcode is utilized, such barcode may be generated using a generation program provided from a freeware or a shareware, for example. At that time, the decoding information can also generated because of a large amount of information.

The document-code converting section 513 or the identification-code converting section 519 transfers the generated two-dimensional barcode to the encoded-document generating section 524. The encoded-document generating section 524 synthesizes (i) an image with a document image in a non-disclosed area, which is recognized based on entity information of the original application form and non-disclosed area information (coordinate information specifying a confidential portion), removed from the image of the entered application form obtained from the document repository server 4, (ii) the two-dimensional barcode of the confidential portion and (iii) the two-dimensional barcode of the identification information for the document management, to form the encoded application form.

In contrast, when the one-dimensional barcode is utilized, an amount of recorded information is considerably small in comparison with the case where the two-dimensional barcode is utilized. Therefore, when the information of the portion whose concealability must be ensured is coded into the one-dimensional barcode, a recording area is enlarged and thus an unpractical issue is caused.

In order to avoid this issue, decoding information, which can specify the original information of the portion that must be concealed, is generated for the portion—which needs the concealment—of the application form with associated with the identification information. Also, the identification information, which can uniquely specify the decoding information, is recorded in the encoding information. The decoding information is stored in the decoding-information managing server 7 with associated with the identification information.

For example, either the confidential-document processing server 5 or the decoding-information managing server 7 are provided with a barcode providing function. The barcode providing function may be implemented by a barcode providing server, and a barcode management table, which manages plural types of barcodes and barcode data, into which various information about documents are barcoded, by a table is utilized there. The document-code converting section 513 transmits a document ID of a new application document, non-disclosed area information, and empty encoded entered information to the barcode providing function, and demands to acquire a corresponding new code ID. The barcode providing function sets the type and the class of the barcode to the barcode data acquired from respective information regarding the new document, and forms a new code ID.

When the communication IF 528 receives a request for the print/output instruction of the confidential document, the document-code converting section 513 acquires a barcode image used to form the encoded application form from the barcode providing function. In other words, when receiving the print/output instruction, the document-code converting section 513 exchanges information with the barcode providing function, and transmits the original document information (application original identification information), the non-disclosed area information (coordinate information), and the like to the barcode management server of the barcode providing function. The barcode management server adds predetermined peculiar information to the received data, and registered it in the barcode management table. In addition, the barcode management server applies an encoding process to the registered barcode data, and transfers a resultant barcode image to the encoded-document generating section 524.

The encoded-document generating section 524 synthesizes (i) an image with a document image in a non-disclosed area, which is recognized based on entity information of the original application form and non-disclosed area information (coordinate information specifying a confidential portion), removed from the image of the entered application form obtained from the document repository server 4, (ii) the one-dimensional barcode of the confidential portion and (iii) the one or two-dimensional barcode of the identification information for the document management, to form the encoded application form.

<Security Function Utilizing Coded Image>

Here, as can be understood from the above configuration, the confidential-document processing server 5 provides a security function to the personal information by utilizing the coded image. That is, since a state, which cannot be read unless such state is decoded according to a predetermined approach, is provided by coding the information that needs the concealment, a security function is provided.

Typically the barcode can be used as the coded image. A wide variety of barcodes are present at this time, and contain the standardized barcodes and non-standardized barcodes. There are the one-dimensional code, the two-dimensional code, and others. As an example of the one-dimensional code, Code 39 and Code 128 are present. As an example of the two-dimensional code, QR (Quick Response) code, PDF417, DataMatrix, MaxiCode, IntactaCode, and the like are present. These barcodes are obtained by coding given information in compliance with the algorithm peculiar to the barcode, and then converting the coded information into the image.

Since image information, a meaning of which any person cannot understand when looks at the image itself, can be obtained by employing these barcodes, the security can be maintained by converting the information that needs the concealability into the barcode. In this case, since the decoding of the barcode can be performed by using the predetermined algorithm peculiar to the barcode, some person who knows the type of barcode and the peculiar decoding algorithm can decode the original information from the barcode, so that it is not impossible to say that a security function is absolutely secure. In view of this respect, it is desired that a security function utilizing the cryptography described later should be employed together.

<Confidential-Document Decoding Apparatus>

The confidential-document decoding apparatus 53 includes an encoded-image acquiring section 532, a machine-readable information sensing section 534 and an identification-information decoding section 536. The encoded-image acquiring section 532 acquires a read image of the encoded application. The machine-readable information sensing section 534 senses the machine-readable document information and the machine-readable identification information from the encoded image, which the encoded-image acquiring section 532 acquires. The identification-information decoding section 536 decodes the machine-readable identification information, which the machine-readable information sensing section 534 sensed, to the original identification information (identification information, which is unreadable).

Also, the confidential-document decoding apparatus 53 includes a decoding-information acquiring section 538, a document-information decoding section 540, a decoding-process controlling section 542 and a communication IF (interface) section 548. The decoding-information acquiring section 538 acquires the decoding information required when the machine-readable document information is decoded into the original document information (the document information, which is readable). The document-information decoding section 540 decodes the machine-readable document information, which the machine-readable information sensing section 534 has sensed, to the original document information (the document information, which is readable). The decoding-process controlling section 542 controls the decoding process in the document-information decoding section 540 based on the attribute information indicating the editing history of the encoded document. The communication IF section 548 receives and transmits the electronic document. In this case, when the confidential-document generating apparatus 51 and the confidential-document decoding apparatus 53 are constructed integrally, one communication IF, which is used commonly as the communication IF sections 528, 548, may be provided.

The decoding-process controlling section 542 accesses a function portion (an editing-history managing section 714 described later), which manages the history information indicating that the attribute change such as reediting, modification, deletion, invalidation, or the like is applied to the encoded document on the document repository server 4 after the encoded document is printed, and specifies the editing history from the attribute information regarding the editing process of the encoded application form (document editing information). Alternatively, when the document editing information, which is the history information, is associated with the attribute information of the decoding information, the decoding-process controlling section 542 specifies the editing history from the attribute information.

When the two-dimensional code is embedded in the machine-readable document information and the contents of the decoding information is also contained therein, the document-information decoding section 540 can acquire the decoding information and decode into the original document without depending on the identification-information decoding section 536 and the decoding-information acquiring section 538. In contrast, when the contents of the decoding information is saved in the decoding-information managing server 7 with associated with the identification information, firstly the decoding-information acquiring section 538 refers to the identification information decoded by the identification-information decoding section 536 to access the decoding-information managing server 7. Then, the decoding-information acquiring section 538 searches the decoding information corresponding to the identification information to acquire the decoding information from the decoding-information managing server 7. The decoding-information acquiring section 538 transfers the decoding information to the document-information decoding section 540. The document-information decoding section 540 decodes the machine-readable document information into the original document information based on the decoding information acquired by the decoding-information acquiring section 538.

In decoding the machine-readable document information into the original document information based on the decoding information, firstly the decoding-process controlling section 542 decides whether or not the decoding process can be executed, based on the editing history of the encoded document. Then, the document-information decoding section 540 executes the actual decoding process only when the decoding-process controlling section 542 permits the decoding process.

Even though the attribute change such as reediting, modification, deletion, invalidation, or the like is applied to the encoded document on the document repository server 4 after the encoded document is printed, it can be controlled whether or not the decoding of the machine-readable document information printed on the paper sheet can be executed, by controlling whether or not the decoding process can be executed, based on the attribute change of the document. Therefore, the view of the designated portion on the sheet paper can be controlled jointly with the attribute of the electronic document.

<Configurative Example of Decoding-Information Managing Server>

Figure 4:
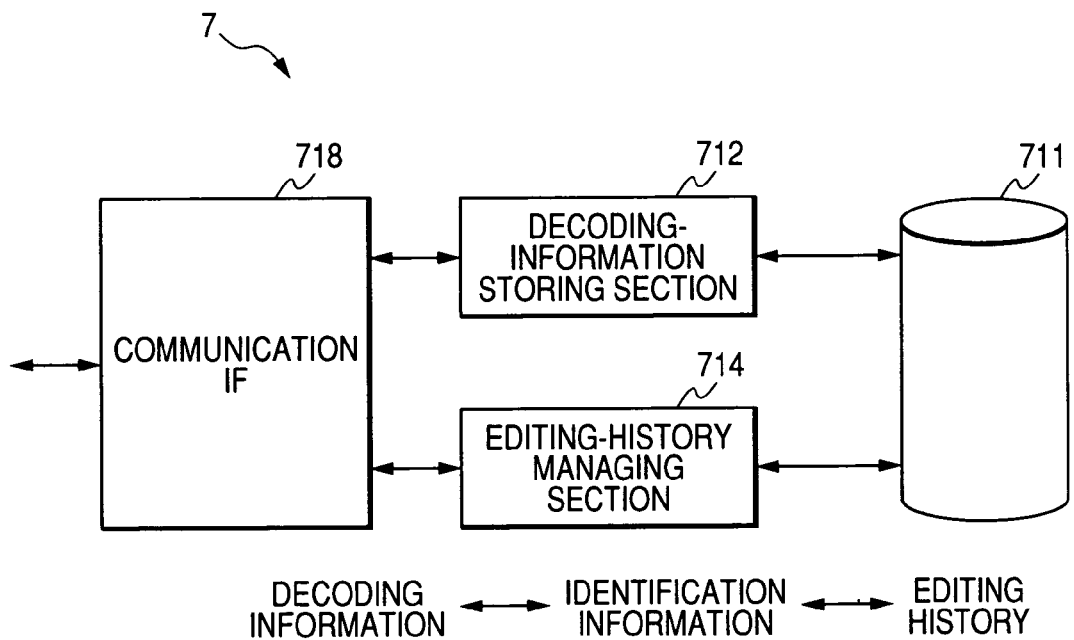
FIG. 4 is a functional block diagram showing a configurative example of a decoding-information managing server.

FIG. 4 is a functional block diagram showing a configurative example of the decoding-information managing server 7. The decoding-information managing server 7 includes a decoding-information storing section 712, an editing-history managing section and a communication IF (interface) section 718. The decoding-information storing section 712 stores the decoding information, which is used to decode the machine-readable document information to the original decipherable document information, in a memory medium 711 such as a hard disk drive, an optical disk drive, or the like with the decoding information associated with the identification information. The editing-history managing section 714 stores information (so-called history information) of the attribute change of the encoded document such as reediting, modification, deletion, invalidation, or the like in the memory medium 711 with the history information associated with the identification information.

When the encoding section 514 in the machine-readable-document-information converting section 512 of the confidential-document processing server 5 encodes the information of the confidential document, the decoding-information storing section 712 stores a decoding key corresponding to an encoding key as the decoding information together with the identification information.

When the attribute change such as reediting, modification, deletion, invalidation, or the like is applied to the encoded document on the document repository server 4 after the encoded document is printed, the editing-history managing section 714 may save the history information separately from the decoding information with the history information associated with the identification information. Alternatively, the editing-history managing section 714 may change the attribute of the decoding information to save the history information with the history information and the decoding information effectively integrally associated with the identification information. As a result, the management of the history information can be facilitated.

In this case, the editing-history managing section 714 may manage that the editing was applied to the encoded document, which has been printed out on the document, repository server 4 after the printing output. This editing-history managing section is not always provided in the decoding-information managing server 7, and may be provided in the document repository server 4, for example.

<Security Function Utilizing Cryptography>

Here, as appreciated from the above configuration, the document processing system 1 provides a security function to the personal information by utilizing an encoding function based on the key cryptosystem. That is, since information that needs concealment is encoded by using a predetermined encoding key, a state that cannot be read unless such state is decoded by using a decoding key corresponding to the encoding key is provided. As a result, a security function can be provided.

As the system utilizing the encoding function based on the key cryptosystem, the confidential information have already been exchanged in various commercial transactions on the network. In order to protect the security, basically two typical types of cryptosystems consisting of a public key cryptosystem using a pair of mutually different keys, i.e., a public key and a private key, and a common key cryptosystem for executing the encoding and the decoding using one key are employed. Both cryptosystems give the electronic security technology that encodes the given document by using the electronically formed key information. In this case, the encoding technology based on the public key cryptosystem and the common key cryptosystem is publicly known and also the encoding means and the decoding means used in respective cryptosystems are publicly known, and therefore their explanation is omitted herein.

Since the common key cryptosystem employs only one key information, the person who knows the key can decode the information when the key information leaked out. Hence, the common key cryptosystem cannot provide the high security function that the public key cryptosystem can provide. Principally any of these two cryptosystems may be employed from this respect, but it is concluded that the public key cryptosystem is desirable in a sense of the high security guarantee. Of course, even when the common key cryptosystem is employed, the security function can be enhanced rather than the case where a single cryptosystem of them is employed if the security function utilizing the above coded image is applied together.

<One Example of Entered Document>

Figure 5C:
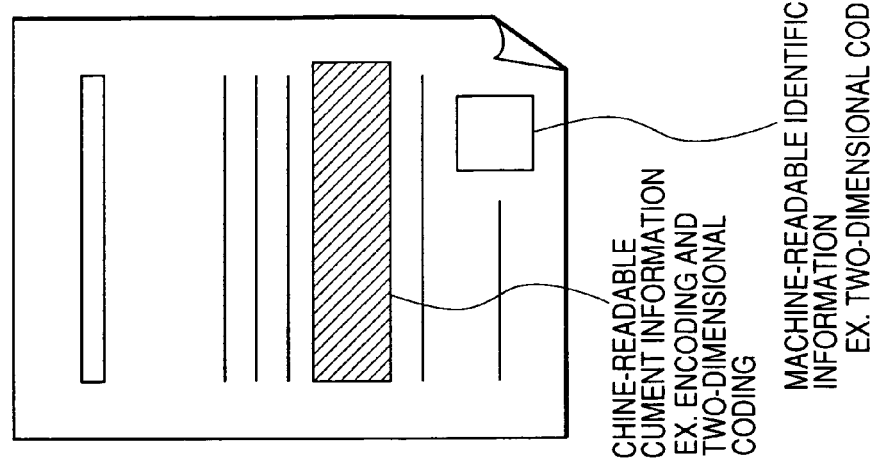
FIG. 5 is a schematic view showing an example of an entered document used in the document processing system.
Figure 5B:
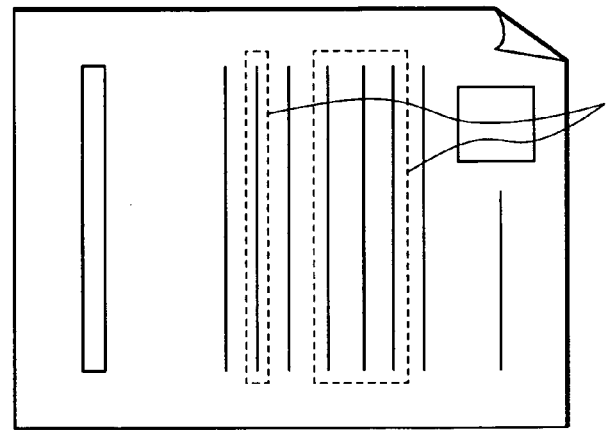
Figure 5A:
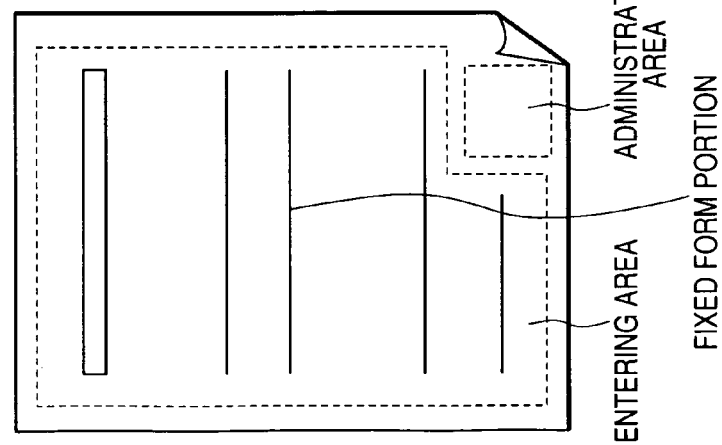

FIG. 5 is a schematic view showing an example of an entered document used in the document processing system 1 of this embodiment. Here, FIG. 5A shows an example of the unentered application form, FIG. 5B shows an example of the entered application form (original application form), and FIG. 5C shows an example of the encoded application form.

First, the unentered application form, which is an original application form shown in FIG. 5A, is stored in the document repository server 4. A fixed form portion containing a document title, name and phone number previously entered is present in the unentered application form. An entering area into which an applicant enters items in accordance with the fixed form and an administrative area are prepared. The entering area of the original document is managed with divided into a non-disclosed area set previously and a disclosed area. The identification information acting as a key in specifying the original document information, the decoding information and/or the document editing information appears as character information and/or an image in the administrative area of the unentered application.

As the original document information of the unentered application form, for example, the document file name or the document ID can be used. Also, as other information, version information of the unentered application form may be contained. The non-disclosed area means an area, which is to be masked (hidden) in printing the application form, of the portion of the unentered application form into which an applicant enters contents. The disclosed area means an area, which is not to be masked conversely. The information of the non-disclosed area and the information of the disclosed area are managed as information, which can specify relatively the arrangement of respective areas in the whole original document.

Then, the entered application form shown in FIG. 5B is stored in the document repository server 4. The entering information entered by an applicant (applicant entering information) exists in this entered application form. Here, the entering information indicates the overall information inserted into the unentered application form, which is the original document, by the applicant. When the insertion is made after the original document is edited electronically, inserted characters, symbols, etc. correspond to the entering information. When the information is entered on the paper, images of the information, which is not present in the printed image of the original document but is newly added, correspond to the entering information. This entered application itself is stored in the document repository server 4.

Also, at this time, information of a user attribute of an entering person (i.e., applicant) and the version of the entered application form are also stored with associated with each other. When the attribute change such as reediting, modification, deletion, invalidation, or the like is applied later, the editing history information is recorded every time with associated with the entered application form stored in the document repository server 4. The applicant himself/herself (typical example of a person having valid access right) can access the newest entered application form at any time, and can issue a print output in accordance with necessity (as a typical example, in filing to the destination agent).

When the print output is issued, not the entered application form shown in FIG. 5B itself but the encoded application form shown in FIG. 5C is printed out. In this encoded application form, the information in the non-disclosed area of the entered area is encoded and then printed out. Alternatively, the information in the non-disclosed area is coded and imaged as one-dimensional or two dimensional barcode image, and then printed out. Of course, the encoding and the coding may be employed in combination, where firstly the information in the non-disclosed area may be encoded, may be coded as the barcode image and then may be printed out in the corresponding portion.

Also, the identification information used to specify uniquely the encoded application form is encoded and printed out in the administrative area or is coded as the one-dimensional or two-dimensional barcode image and then printed out. Of course, the encoding and the coding can be employed in combination, where first the information in the non-disclosed area may be encoded, then may be coded as the barcode image, and then may be printed out to the corresponding portion.

Since an amount of recorded information is large when the two-dimensional barcode (two-dimensional code) is employed, the decoding information can also recorded. Thus, there is no need to save separately the decoding information in the server, and such an advantage can be achieved that a system configuration and the management are simplified. In this embodiment, even when the decoding information is printed as the two-dimensional code, or the like, the decoding process is not immediately carried out. Alternately, only when the decoding process is permitted by referring the latest attribute information regarding the encoded application that is managed to correlate with the identification information, such decoding process is actually carried out.

In this embodiment, the case where the information in the non-disclosed area is encoded/coded and then printed directly on the corresponding portion has been described. However, the corresponding portion may be kept blank and such information may be printed in the administrative area like the identification information. At this time, the information in the non-disclosed area and the identification information may be integrated collectively and then printed.

<Confidential Document Generating Process>

Figure 6:
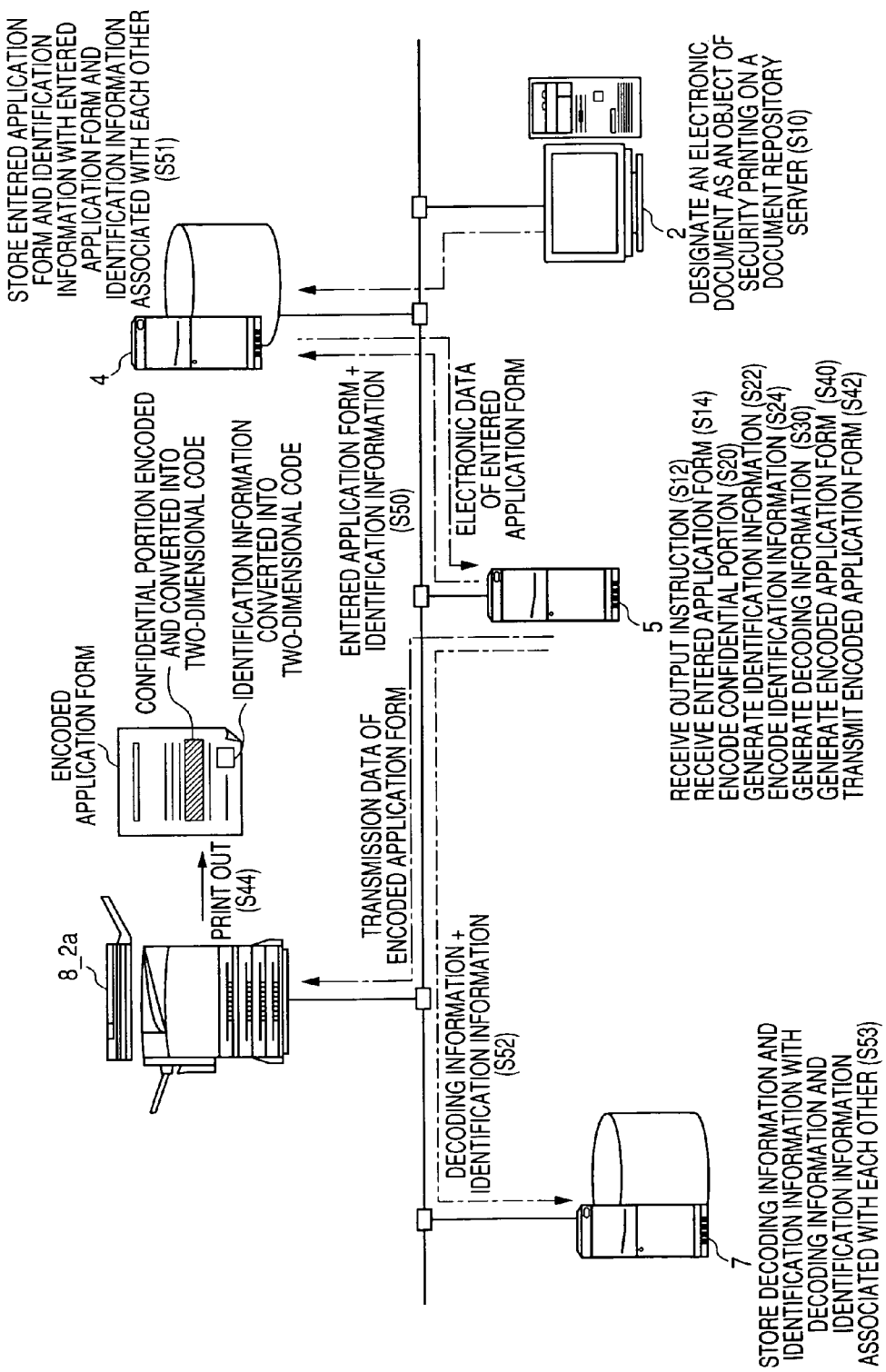
FIG. 6 is a view explaining an example of processing procedures of generating an encoded document.

FIG. 6 is a view explaining an example of processing procedures of generating an encoded document (e.g., an application form, which is a confidential document having a coded image) in the document processing system 1. Here, the case where a two-dimensional code is used as the machine-readable information is described.

In the document processing system 1, a user (applicant) accesses the document repository server 4 from the user terminal 2, and designates the electronic document (entered application form), which has been stored once, as an object of security printing, on the document repository server 4 (S10).

When the user issues output instruction of the entered application form stored in the document repository server 4 from the user terminal 2, firstly the confidential-document processing server 5 receives the output instruction (S12). Upon receiving the output instruction, the confidential-document processing server 5 acquires an electronic document of the designated entered application form from the document repository server 4 and then starts generating process of an electronic document of the encoded application (S14).

In this generating process, the machine-readable-document-information converting section 512 encodes a confidential portion of the document so that such portion can be read later by machines (S20). Also, the identification-information generating section 516 generates identification information, which can specify uniquely the encoded portion (S22). Then, the machine-readable-identification-information converting section 518 converts the identification information generated by the identification-information generating section 516, into code data (S24).

Also, the confidential-document processing server 5 generates the decoding information to control a process of decoding a document code of the confidential portion (S30). The generated decoding information can be managed with associated with the identification information. At this time, the decoding information may be coded and then synthesized with the coded portion of the confidential portion into a document. Alternatively, the generated decoding information may be associated with the identification information, and then sent out to the decoding-information managing server 7 and registered therein.

Also, in the latter case, if necessary, code data of the confidential portion may be encoded and then its decoding key may be used as the decoding information. At this time, information entered into the non-disclosed area by the applicant is encoded using the public key of the destination agent.

Then, the encoded-document generating section 524 synthesizes code data of the confidential portion and code data of the identification information into the confidential document to generate the encoded application form (code document) (S40). Then, the synthesized electronic document (the electronic document of the encoded application form) is transmitted to the image forming apparatus 8_2a to instruct an outputting process (S42). Upon being instructed to execute the outputting process, the image forming apparatus 8_2a prints the application form, which has been encoded by using the two-dimensional code (S44). The applicant submits the printed encoded application form to a predetermined destination agent. The printed encoded application form contains the confidential portion, which is encoded and two-dimensionally coded, and the identification information, which is two-dimensionally coded and is used to specify this encoded application form.

Also, the confidential-document processing server 5 transmits the document information of the entered application form and the identification information to the document repository server 4 (S50). When the decoding information is to be stored in the decoding-information managing server 7, the confidential-document processing server 5 transmits the decoding information and the identification information to the decoding-information managing server 7 (S52). In the document repository server 4 that has received the entered application form and the identification information, the document storing section 412 stores the entered application form and the identification information in the memory medium 411 with the decoding information and the identification information associated with each other (S51). In the decoding-information managing server 7 that has received the decoding information and the identification information, the decoding-information storing section 712 stores the decoding information and the identification information in the memory medium 711 with the decoding information and the identification information associated with each other (S53).

<Confidential Document Editing Process>

Figure 7:
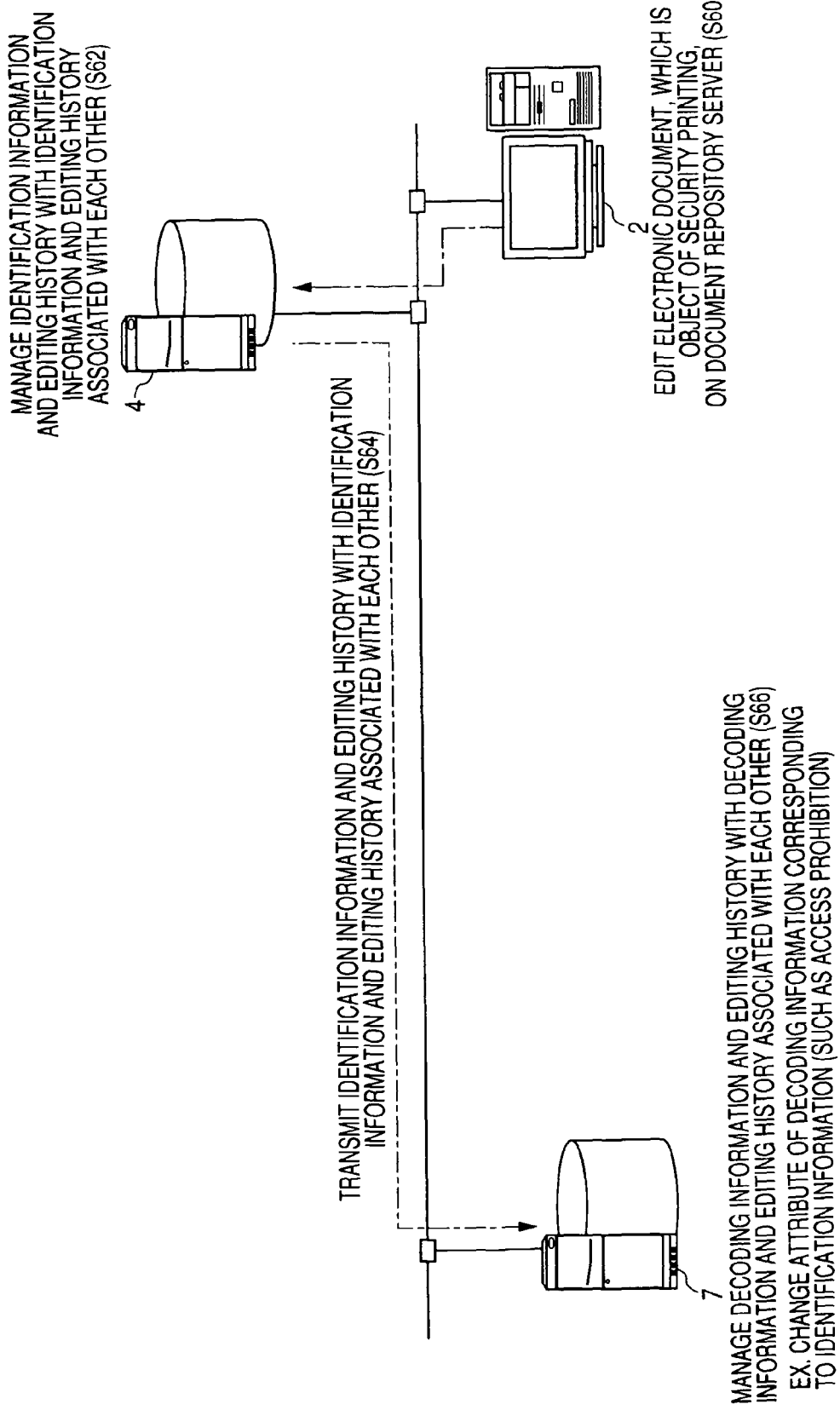
FIG. 7 is a view explaining an example of processing procedures of applying an editing to an encoded application.

FIG. 7 is a view explaining an example of processing procedures of applying editing to the encoded application form. When the editing is applied to the printed encoded application form on the electronic document after the print output, the user (applicant) accesses the document repository server 4 from the applicant terminal 2 to read the electronic document as an object of security printing, and applies editing to the electronic document on the document repository server 4 (S60). The history information is managed in the document storing section 412 of the document repository server 4 with associated with the identification information, whenever the editing is executed (S62).

In addition, the editing-history managing section 714 of the decoding-information managing server 7 is noticed of the history information of that editing with the history information associated with the identification information (S64). The history information is managed with associated with the decoding information (S66). Upon receiving this notice, the editing-history managing section 714 associates the history information and the decoding information integrally with the identification information, for example, by changing the attribute of the decoding information, and store them therein.

For example, if the attribute change such as reediting, modification, deletion (cancellation), invalidation, or the like is applied after the encoded application form is printed out and the user wishes to prohibit access itself to the printed encoded application form, inhibition of the access right is set as the attribute information. Here, the inhibition of the access right may be controlled at a user's level. For example, in the case where the access right to permit the decoding is set to all departments initially, the user may wish to limit the department that is permitted to decode the information after the printing.

<Confidential Document Decoding Process>

Figure 8:
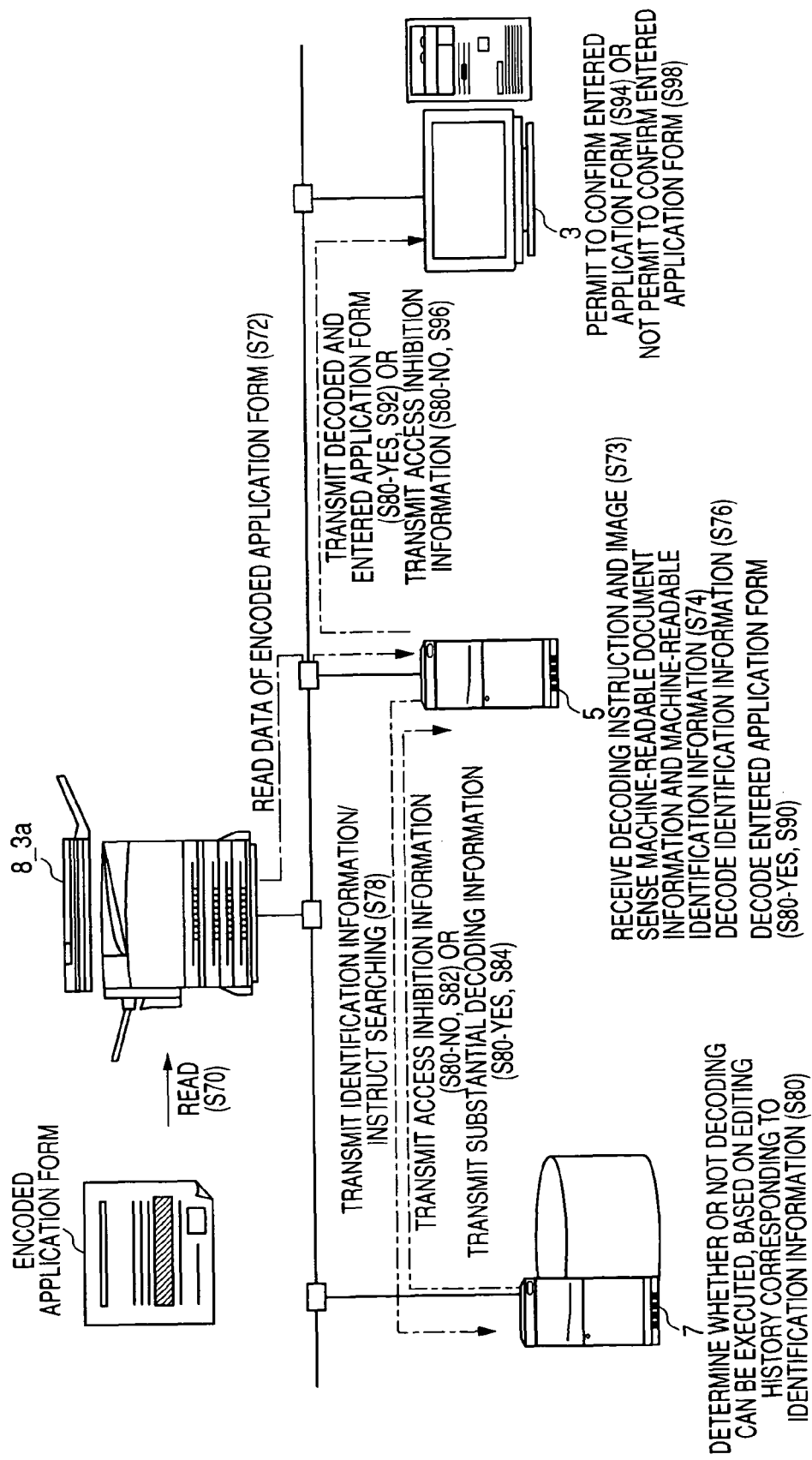
FIG. 8 is a view explaining an example of processing procedures of decoding the encoded application.

FIG. 8 is a view showing an example of processing procedures of decoding the entered information, into which the printed encoded application form is encoded.

When the destination agent, which has accepted the submission of the encoded application form from the applicant, executes the process based on the encoded application form, it is necessary that the encoded application form is decoded to the readable original entered application form. Here, when a user (here a person of the destination agent in charge) wishes to decode the confidential document (encoded application form) printed, firstly the user causes a scanner device (not shown) connected to the image forming apparatus 8 or the destination terminal 3 to read the confidential document, and then issues a decoding request (S70). Accordingly, a decoding notice is transmitted together with the read image data to the confidential-document processing server 5 (S72).

When the decoding request is issued, firstly the confidential-document processing server 5 receives this decoding instruction. The confidential-document processing server 5 receives the image data of the read document by the encoded-image acquiring section 532 (S73). Also, the machine-readable information sensing section 534 senses the machine-readable document information and the machine-readable identification information from the encoded image acquired by the encoded-image acquiring section 532 (S74). Then, the identification-information decoding section 536 decodes the machine-readable identification information sensed by the machine-readable information sensing section 534, to the original readable identification information (S76). Then, the decoding-information acquiring section 538 sends the identification information decoded by the identification-information decoding section 536, to the decoding-information managing server 7 and instructs the decoding-information storing section 712 to search the decoding information corresponding to the identification information (S78).

Upon receiving this searching instruction, the decoding-information managing server 7 searches the decoding information corresponding to the informed identification information, from among the decoding information stored in the decoding-information storing section 712. Then, the decoding-information managing server 7 sends the found decoding information to the confidential-document processing server 5. At this time, unlike the system configuration according to the prior art, the decoding-information managing server 7 does not directly send the found decoding information corresponding to the informed identification information, to the confidential-document processing server 5. Instead, firstly, the decoding-information managing server 7 reads the information of the editing history regarding the encoded application form corresponding to the informed identification information, and then decides whether or not the decoding process can be executed (S80). For example, when the history information is associated as the attribute information of the decoding information, the decoding-information managing server 7 identifies the editing history by using the attribute information and decides whether or not the decoding process can be executed.

Then, when the editing such as reediting, modification, deletion (cancellation), invalidation, or the like is applied after the encoded application form is printed and a state that the access to the printed encoded application form itself is prohibited (containing the inhibition of the access right at the user level) is set (S80-NO), the decoding-information storing section 712 does not inform the decoding information but transmits access inhibition information (S82). In contrast, when no editing is applied or the decoding process is permitted even when the editing is applied (S80-YES), the decoding-information storing section 712 transmits the decoding information corresponding to the informed identification information to the confidential-document processing server 5 (S84).

When the confidential-document processing server 5 can acquire the decoding information from the decoding-information managing server 7, the document-information decoding section 540 decodes the machine-readable document information sent from the machine-readable information sensing section 534, to the original document information (the document information in a state that is readable; the electronic document of the entered application form) by using the decoding information (S90). Then, the confidential-document processing server 5 transmits the electronic document of the decoded and entered application form (i.e., contents of the decoded result) to the destination terminal 3 (S92).

Accordingly, when the decoding process is permitted even after the attribute change such as reediting, modification, deletion, invalidation, or the like (S80-YES), the user having a valid access right (in this example, a person of the destination agent in charge) can check (view) contents of the confidential portion in the encoded application form, which is offered from the applicant as the printed matter and whose confidential portion is concealed, on the destination terminal 3 (S94).

In contrast, when the confidential-document processing server 5 cannot acquire the decoding information from the decoding-information managing server 7 and receives the access inhibition information (S80-NO), the confidential-document processing server 5 does not execute the decoding process at the document-information decoding section 540, but informs the destination terminal 3 of the fact that the decoding process is prohibited as a decoding result (S96). Accordingly, when the decoding process is prohibited after the attribute change such as reediting, modification, deletion, invalidation, or the like, even a user having a valid access right rightfully (in this example, a person of the destination agent in charge) cannot check (view) contents of the confidential portion in the encoded application form on the destination terminal 3 (S98).

In other words, when the confidential-document processing server decodes the machine-readable document information to the original document information based on the decoding information, firstly it is decided whether or not the decoding process can be executed, based on the editing history of the encoded document. Then, the decoding process is executed actually only when the decoding process is permitted. Even when the editing such as reediting, modification, deletion, invalidation, or the like is applied to the encoded document after the encoded document is printed, the view of the designated portion on the paper sheet can be controlled jointly with the attribute of the electronic document because it is controlled whether or not the decoding process can be executed, based on the editing history information of the document. In case that the electronic document is changed by reediting, cancel, or the like, the designated portion of the corresponding printed document can be deleted/invalidated. As a result, the flood of unnecessary confidential documents can be prevented and information leakage can be reduced.

Also, the applicant can get two types of documents of the autographed entered application and the printed out encoded application, so that the applicant can hold the entered application as a duplicate and submit the encoded application to the destination agent. Therefore, normally the application is passed through the hands of a number of people until such application is delivered to the person in charge of process in the destination agent by transporting it via a mail service or bringing directly it. However, it is the printed encoded application that is transferred actually between the process charged person and the applicant, and the portion whose security must be ensured is not printed in such a state that its contents are decipherable at first sight. Therefore, it may be considered that the confidential information is seldom leaked to a third person in the course of transportation. The document processing system that can guarantee the security can be realized.

Also, in this embodiment, the agent (decoding-information managing server 7) for managing the decoding information and providing the encoding key information, the agent (confidential-document processing server 5) for generating the machine-readable information, and the like are provided respectively as the agent that can do independently the business. Therefore, since each agent cannot decode the encoded or machine-readable information by itself, the higher security function can be realized. In addition, since each agent can apply performance enhancement, various updates, etc. freely individually within own business field, a flexible system application can be accomplished and also an improvement in the system technology can be easily achieved.

Also, in this embodiment, a system is constructed by building up the server constituting the document processing system, and it is not needed to prepare the document processing system individually on respective terminals 2, 3 side. As a result, a system cost can be reduced as a whole.

<Configurative Example of System Utilizing Computer>

In this embodiment, the system for executing various processes (document processes) relating to the confidential document is not limited to the configuration constructed by the hardware processing circuit. Such system can be realized by software based on program codes to realize the functions by using the electronic computer (computer).

Therefore, a program suitable to accomplish the document processing method of the document processing system (the document repository server 4, the confidential-document processing server 5 having the confidential-document generating apparatus 51 and the confidential-document decoding apparatus 53, the decoding-information managing server 7) according to the invention by software using the electronic computer (computer) or a computer-readable memory medium for storing this program can be extracted as the invention.

When the electronic computer is caused to execute a series of document processing functions by software, the program constituting the software is installed into a computer (built-in microcomputer) into which a dedicated hardware is incorporated, SOC (System On a Chip) in which CPU (Central Processing Unit), logic circuits, memory devices, etc. are mounted on one chip to realize a desired system, a general-purpose personal computer that can execute various functions by installing various programs, or the like from the recording medium.

The recording medium causes a status change of energy such as magnetism, light, electricity, or the like in the reading device provided to hardware resources of the computer in response to description contents of the program, and transmits the description contents of the program to the reading device in a signal format corresponding to this change.

For example, the recording medium may be constructed by not only a package media (mobile memory medium) such as a magnetic disk (containing a flexible disk FD) in which the program is recorded, an optical disk (containing CD-ROM (Compact Disc-Read Only Memory), DVD (Digital Versatile Disc)), a magnetooptical disc (containing MD (Mini Disc)), a semiconductor memory, or the like, which is distributed separately from the computer to provide the program to the user, but also ROM, a hard disk, or the like in which the program is recorded, which is provided by the user in a state that such medium is built previously in the computer.

Also, the program constituting the software is provided via the memory medium, but a way of providing the program is not limited to this. The program may be provided via cable or radio communication network not to use the recording medium.

For example, when the memory medium that records the program code of the software to realize the document processing function is supplied to a system or an apparatus and then the computer (or CPU or MPU) in the system or the apparatus reads/executes the program code stored in the memory medium, the same advantage as the case where the memory medium is constructed by the hardware processing circuit can be attained. In this case, the program code itself being read from the memory medium implements the document processing function.

Also, not only the function of processing the document can be implemented by executing the program code that the computer reads, but also OS (Operating Systems; basic software), or the like, which is operating on the computer, executes a part or all of the actual processes based on the instruction of the program code and then the function of processing the document can be implemented by such process.

Further, the program code read from the memory medium may be loaded on the memory provided to the extensions card inserted into the computer or the extensions unit connected to the computer, then the CPU, or the like installed into the extensions card or the extensions unit may execute a part or all of the actual processes based on the instruction of the program code, and then the function of processing the document may be implemented by such process.

Also, the program is provided as a file in which the program code to realize the function of processing the document is described. In this case, the provision of the program is not limited to a packaged program file. The program may be provided as the individual program module in answer to the hardware configuration of the system constructed by the computer.

Figure 9:
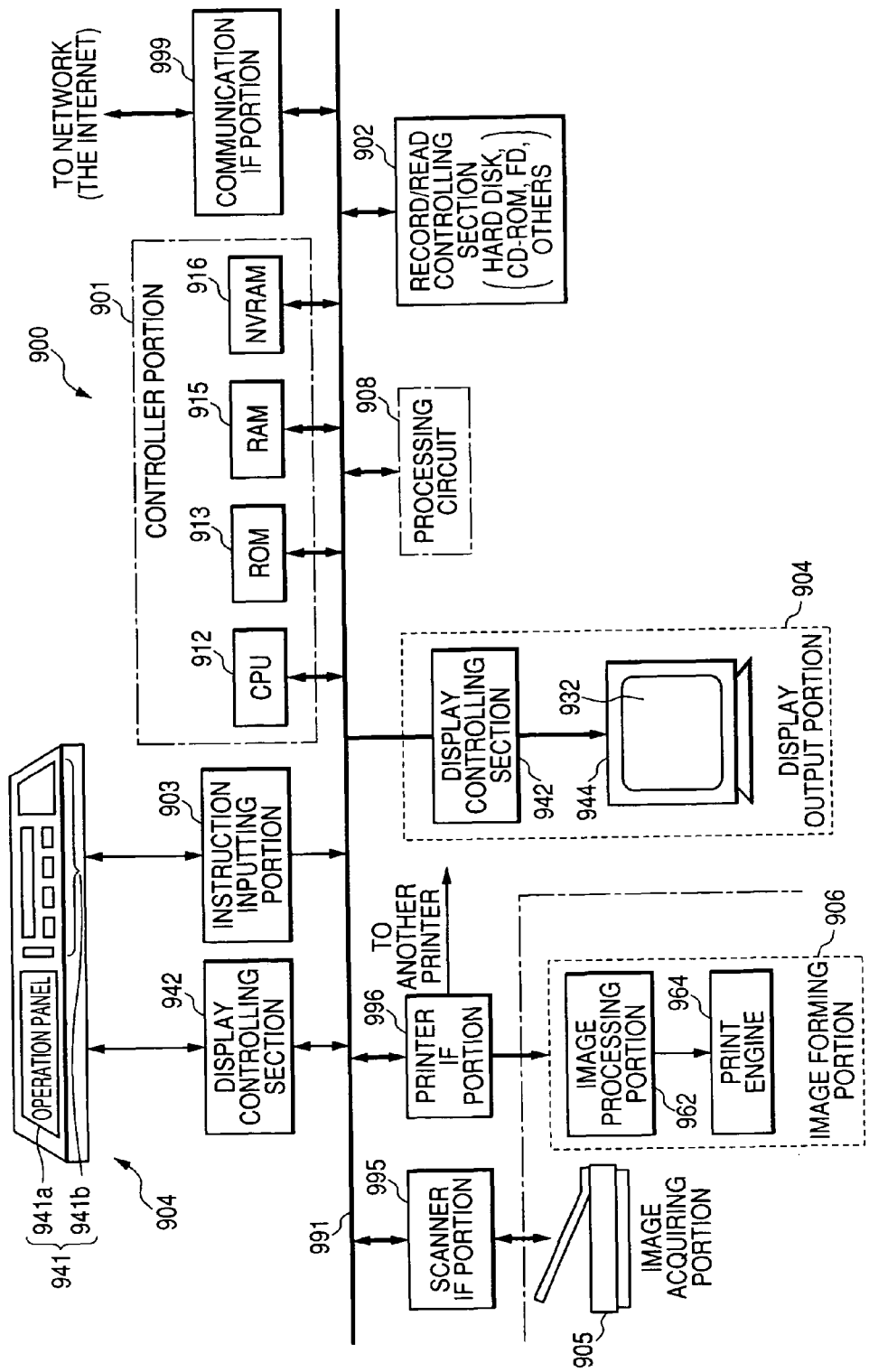
FIG. 9 is a view showing an example of a hardware configuration when the document processing system is constructed by using a computer.

For example, FIG. 9 is a block diagram showing an example of a hardware configuration when the document processing system having the function of processing the document is constructed by software utilizing CPU, a memory, and the like, i.e., the document processing is implemented by software by utilizing functions of the computer (electronic computer) such as the personal computer.

Of course, the hardware configuration is not limited to such configuration using the computer. The configuration for processing the document can be constructed by a combination of dedicated hardwares that execute processes of respective function portions in the document processing system shown in FIG. 2, FIG. 3, and FIG. 4. In this event, because a system for executing the process by software is employed, such an advantage can be attained that the process procedures, and the like can be changed easily without change of the hardware.

For example, a computer system (document processing system) 900 includes a controller portion 901, and a record/read controlling section 902 such as a hard disk drive, a flexible disk (FD) drive, or a CD-ROM (Compact Disk ROM) drive, a semiconductor memory controller, and others, which is used to read/record the data from/to a predetermined memory medium.

The controller portion 901 has a CPU (Central Processing Unit) 912, a ROM (Read Only Memory) 913 as a read only storing portion, a RAM (Random Access Memory) 915 as an example of the volatile storing portion that can write and read any time, a RAM (described as NVRAM) 916 as an example of the nonvolatile storing portion. For example, temporary data, and the like can be stored in the NVRAM 916. In this case, the NVRAM 916 functions as a temporary data saving portion.

The "volatile storing portion" in the above means the storing portion of the type that erases stored contents when a main power supply of the document processing system is turned OFF. In contrast, the "nonvolatile storing portion" means the storing portion of the type that continues to hold the stored contents even when a main power supply of the document processing system is turned OFF. Any means may be employed if such means can continue to hold the stored contents. The nonvolatile storing portion is not limited to the semiconductor memory device itself having nonvolatility. A configuration that can give the "nonvolatility" to the volatile memory device by providing a backup power supply may be employed. Also, the nonvolatile storing portion is not limited to the semiconductor memory device, and may be constructed by utilizing the medium such as the magnetic disk, the optical disk, or the like. For example, the hard disk drive can be utilized as the nonvolatile storing portion.

The computer system 900 includes an instruction inputting portion 903 having a keyboard, a mouse, and the like as the function portion acting as the user interface, a display outputting portion 904 for offering predetermined information such as a guidance screen in operation, process results, and the like to the user, and an interface portion (IF portion) 909 performing an interface function between respective functions portions.

The display outputting portion 904 has a display controlling section 942 and a display device. As the display device, for example, an operation panel 941 provided to the document processing system can be utilized. Otherwise, a display portion 944 constructed by CRT, LCD, or the like can also be utilized.

For example, a display controlling section 942 causes the operation panel 941 consisting of a display panel portion 941*a* and an operation key 941*b* such as a ten keys and others or the display portion 944 to display the guidance information, the image, and the like. Also, the operation panel 941 can be utilized as the display device used to inform the user of various information. The instruction inputting portion 903 used to input predetermined information with a tip of a finger, a pen, or the like can be constructed by providing a touch panel 932 to a display screen of the display portion 944.

When the confidential-document generating apparatus 51 and the confidential-document decoding apparatus 53 are provided to the applicant terminal 2 and the destination terminal 3 respectively such that the generating process of the encoded document and the decoding process of the encoded document can be executed solely respectively, a function portion for applying a predetermined data processing to the data in the document processing can be provided to the computer system 900. For example, preferably an image acquiring portion (scanner unit) 905 for reading the image of the processed object as a function portion for acquiring the transmitting image data, and an image forming portion 906 for outputting the processed image to a predetermined output medium (e.g., printing paper) may be provided.

The image acquiring portion 905 has a function as the image input terminal. For example, the image acquiring portion 905 picks up the image on the original when the original fed to the reading position is irradiated with a light while using a full width array of the CCD solid state image sensor, and then converts the R (red), G (green), B (blue) analog video signals representing the read image into the digital signals.

The image forming portion 906 forms (prints) a visible image on an ordinary paper or a thermal paper by utilizing the electrophotography, thermal, thermal transfer, ink jet, or similar image forming apparatus in the prior art, based on the image represented by the image signals acquired by the image acquiring portion 905 or the received image data.

Therefore, the image forming portion 906 has an image processing portion 962 for generating print output data such as binary signal of Y (yellow), M (magenta), C (cyan), K (black), for example, and a print engine 964 on a raster output scan base, in an ink jet system, etc., for example.

In addition to a system bus 991 as a transfer bus of the process data (including the image data) and the control data, for example, the interface portion 909 includes the scanner IF portion 995 performing an interface function to the image acquiring portion 905, the printer IF portion 996 performing an interface function to the image forming portion 906 and other printers, and the communication IF portion 999 for mediating the transfer of the communication data to/from the network of the Internet, and the like.

In this case, all processes of respective function portions to process the document are not executed by software, but a processing circuit 908 for executing a part of these function portions by a dedicated hardware may be provided. A system executed by the software can deal with flexibly a parallel processing and a continuous processing, but a process time is prolonged as the process becomes more complicated. Thus, a reduction in a processing speed becomes an issue. In contrast, an accelerator system capable of achieving a higher speed can be constructed by executing the function portions by the hardware processing circuit. The accelerator system can prevent a reduction of the processing speed even when the process is complicated, and can attain a high throughput.

In such configuration, the CPU 912 executes control of the overall system via the system bus 991, and corresponds to the so-called controller portion. The ROM 913 stores the control program of the CPU 912, and the like. The RAM 915 is composed of SRAM (Static Random Access Memory), or the like, and stores program control variables, data for various processes, etc. The RAM 915 contains an area in which the electronic data (this is not limited to character data, and may contain image data) acquired by a predetermined application program, image data acquired by the image acquiring portion 905 provided to own system, electronic documents acquired from the external devices, and the like are stored temporarily.

For example, the program used to cause the computer to execute the document processing function is distributed through the recording medium such as CD-ROM, or the like. Otherwise, this program, may be stored in not CD-ROM but FD. Also, a MO drive is provided, and then the program may be stored in MO. In addition, the program may be stored in other recording medium such as the nonvolatile semiconductor memory card such as the flash memory, and the like. Further, the program may be acquired by downloading the program from other server, or the like via the network such as the Internet, or the like, or updating the program.

Here, as the recording medium to provide the program, in addition to FD, CD-ROM, and the like, the optical recording medium such as DVD, or the like, the magnetic recording medium such as MD, or the like, the magneto-optic recording medium such as PD, or the like, the tape medium, the magnetic recording medium, and the semiconductor memory such as the IC card, the Miniature Card, or the like can be employed. In FD, CD-ROM, or the like as an example of the recording medium, a part or all of functions in implementing the document processing function can be stored.

Also, the hard disk drive contains an area in which data for various processes by the control program are stored, or a large amount of data such as image data acquired by the image acquiring portion 905, image data received from the external device, and the like are temporarily stored. Also, the hard disk drive, the FD drive, or the CD-ROM drive is utilized to register the program data, which are used to execute processes of acquiring the contents, acquiring the address, setting the address, for example, or the like by software, in the CPU 912.

With the above, the invention is explained with reference to the embodiments, but the technical scope of the invention is not limited to a scope recited in the above embodiments. Various variations or modifications can be applied to the above embodiments within a range not departing from the gist of the invention, and various modes in which such variations or improvements are applied are also contained in the technical scope of the invention.

Also, the above embodiments are not limited to the invention according to claims, and all combinations of features explained in the embodiments are not always indispensable to the solving means of the invention. The inventions at various stages are contained in the foregoing embodiments, and various inventions can be extracted based on appropriate combinations in a plurality of disclosed constituent elements. Even when several constituent elements are deleted from all constituent elements illustrated in the embodiments, the configuration from which several constituent elements are deleted can also be extracted as the invention as far as the predetermined advantage can be achieved.

For example, since the document processing system 1 is constructed by utilizing the network, a degree of freedom in deciding where respective function portions concerning the document processing should be arranged on the system is very high, which is commonly applicable to such systems. The above embodiment in which the system is constructed by building up the server simply gives a mere example, and various system configurations can be employed.

For example, the confidential-document generating apparatus 51 in the confidential-document processing server 5 is provided on the network 9 side in such a manner that any applicant terminal 2 can use this confidential-document generating apparatus, while the confidential-document decoding apparatus 53 is provided on the private LAN 9a side located on the inner side of the firewall FW every destination agent.

Of course, while providing the confidential-document generating apparatus 51 to the applicant terminal 2, the confidential-document decoding apparatus 53 may be provided to the destination terminal 3. In this case, there is such a possibility that the hardware change of the terminals 2, 3 is needed, and a system cost is increased as a whole.

As described above, according to one embodiment of the invention, it is managed that the editing is applied on the electronic document, which corresponds to the encoded document, and it is controlled whether or not the decoding process of the encoded document can be executed with referring to the history information. As a result, if the decoding process is permitted even after the editing, a user who has a valid access right can check contents of the encoded portion by decoding them. In contrast, if the decoding process is not permitted after the editing, even a user who has a valid access right cannot check the contents of the encoded portion by decoding them.

In other words, since it is controlled whether or not the decoding process can be executed, based on the information indicating that the editing has been applied to the electronic document corresponding to the encoded document, it can be controlled whether or not the decoding of the encoding information, which is machine-readable information printed on the paper sheet, can be executed. Thereby, the view of the designated portion on the paper sheet can be controlled jointly with (to be matched with) the attribute of the electronic document. As a result, a security function (information leakage preventing function) of the portion—a security of which must be ensured—of the printed document can be ensured and also a matching between the editing applied to the original electronic document and a decision as to whether or not the decoding process can be executed can be achieved.

What is claimed is:

1. A document processing apparatus for processing an encoded document, which is a medium on which a machine readable code comprising a code representing an encoded electronic document is formed, the apparatus comprising:
    an acquiring unit that acquires the machine readable code read from the encoded document;
    an editing-information managing unit that manages editing history information of an electronic document, which is an original document of the encoded document;
    a decoding process unit that decodes the acquired machine readable code on a basis of the editing history information; and
    a decoding-process control unit that gives to the decoding process unit an instruction as to whether the decoding of the machine readable code is permitted or prohibited, on a basis of the editing history information acquired from the editing-information managing unit.

2. The document processing apparatus according to claim 1, wherein the editing history information comprises information indicating whether or not the electronic document, which is the original document of the encoded document, has been edited after the machine readable code was formed on the medium.

3. The document processing apparatus according to claim 1, wherein the editing history information comprises at least one of:
    information indicating reediting of the electronic document;
    information indicating modification of the electronic document;
    information indicating deletion of the electronic document; and
    information indicating invalidation of the electronic document.

4. The document processing apparatus according to claim 1, wherein the machine readable code comprises at least one of a one-dimensional barcode, a two-dimensional barcode and a digital watermark.

5. The document processing apparatus according to claim 1, when the editing history information comprises at least one of:
    information indicating reediting of the electronic document;
    information indicating modification of the electronic document;
    information indicating deletion of the electronic document; and
    information indicating invalidation of the electronic document,
    the decoding-process control unit gives to the decoding-process unit the instruction that the decoding of the machine readable code is prohibited.

6. The document processing apparatus according to claim 5, wherein:
    the machine readable code further comprises identification information, which can be used to identify the electronic document, and
    the decoding-process unit acquires the editing history information using the identification information acquired from the machine readable code.

7. The document processing apparatus according to claim 6, the editing-information managing unit manages the editing information while associating the editing history information with the identification information.

8. A document processing method comprising:
    acquiring a machine readable code read from a encoded document, which is a medium on which the machine readable code comprising a code representing an encoded electronic document is formed; and
    decoding the acquired machine readable code on a basis of editing history information of an electronic document, which is an original document of the encoded document, wherein
    the decoding of the machine readable code is permitted or prohibited based on an instruction, the instruction being based on the editing history information.

9. The document processing method according to claim 8, wherein the editing history information comprises information indicating whether or not the electronic document, which is the original document of the encoded document, has been edited after the machine readable code was formed on the medium.

10. The document processing method according to claim 8, wherein the editing history information comprises at least one of:
    information indicating reediting of the electronic document;
    information indicating modification of the electronic document;
    information indicating deletion of the electronic document; and
    information indicating invalidation of the electronic document.

11. The document processing method according to claim 8, wherein the machine readable code comprises at least one of a one-dimensional barcode, a two-dimensional barcode and a digital watermark.

12. The document processing method according to claim 8, further comprising:
when the editing information comprises at least one of:
information indicating reediting of the electronic document;
information indicating modification of the electronic document;
information indicating deletion of the electronic document; and
information indicating invalidation of the electronic document,
prohibiting the decoding of the machine readable code.

13. The document processing method according to claim 8, wherein:
the machine readable code further comprises identification information, which can be used to identify the electronic document,
the method further comprising:
acquiring the editing history information using the identification information acquired from the machine readable code, wherein the decoding of the machine readable code is performed on the basis of the acquired editing history information.

14. A computer readable medium storing a program including instructions, which when executed, cause a computer to perform document processing, the document processing comprising:
acquiring a machine readable code read from a encoded document, which is a medium on which the machine readable code comprising a code representing an encoded electronic document is formed; and
decoding the acquired machine readable code on a basis of editing history information of an electronic document, which is an original document of the encoded document, wherein
the decoding of the machine readable code is permitted or prohibited based on an instruction, the instruction being based on the editing history information.

* * * * *